United States Patent
Braun et al.

(10) Patent No.: US 8,857,534 B2
(45) Date of Patent: Oct. 14, 2014

(54) ELECTRIC TOOL HAVING AN OPTICAL CONTROL ELEMENT

(75) Inventors: Sigmund Braun, Kusterdingen (DE); Boris Rudolf, Stuttgart (DE)

(73) Assignee: C. & E. Fein GmbH (DE)

( * ) Notice: Subject to any disclaimer, the term of this patent is extended or adjusted under 35 U.S.C. 154(b) by 650 days.

(21) Appl. No.: 11/108,448

(22) Filed: Apr. 18, 2005

(65) Prior Publication Data

US 2005/0259943 A1 Nov. 24, 2005

Related U.S. Application Data

(63) Continuation of application No. PCT/EP03/11098, filed on Oct. 8, 2003.

(30) Foreign Application Priority Data

Oct. 17, 2002 (DE) .................................. 102 48 924

(51) Int. Cl.
*B23Q 17/24* (2006.01)
*B25F 5/00* (2006.01)

(52) U.S. Cl.
CPC .. *B23Q 17/24* (2013.01); *B25F 5/00* (2013.01)
USPC ........................................... 173/29; 173/171

(58) Field of Classification Search
USPC ............. 173/29, 171; 433/29; 310/50, 71, 73, 310/68 A, 68 B; 385/134–137, 53, 63, 65–66
See application file for complete search history.

(56) References Cited

U.S. PATENT DOCUMENTS

| | | | | |
|---|---|---|---|---|
| 2,517,882 | A | | 8/1950 | Johnson .......................... 172/36 |
| 3,590,232 | A | * | 6/1971 | Sadowski ...................... 362/573 |
| 3,897,134 | A | * | 7/1975 | Scrivo et al. .................... 385/78 |
| 4,014,098 | A | * | 3/1977 | Scrivo et al. .................... 433/29 |
| 4,029,390 | A | * | 6/1977 | Chinnock et al. ............... 385/98 |
| 4,254,865 | A | * | 3/1981 | Pacey et al. ..................... 385/99 |
| 4,341,518 | A | * | 7/1982 | Wallace ......................... 433/29 |
| 4,372,511 | A | * | 2/1983 | Knowles ..................... 248/68.1 |
| 4,385,344 | A | * | 5/1983 | Gonser ........................ 362/573 |
| 4,398,885 | A | * | 8/1983 | Loge et al. ..................... 433/126 |
| 4,403,956 | A | * | 9/1983 | Nakanishi ...................... 433/29 |
| 4,460,337 | A | * | 7/1984 | Landgraf et al. ................ 433/29 |
| 4,519,780 | A | | 5/1985 | Strohmaier et al. ............ 433/29 |
| 4,730,887 | A | * | 3/1988 | Boscher et al. ................. 385/46 |
| 4,802,727 | A | * | 2/1989 | Stanley ........................... 385/89 |

(Continued)

FOREIGN PATENT DOCUMENTS

| | | |
|---|---|---|
| DE | 3215210 A1 | 10/1983 |
| DE | 19714248 A1 | 10/1998 |

(Continued)

OTHER PUBLICATIONS

International Search Report, Mar. 19, 2004.

*Primary Examiner* — Michelle Lopez
(74) *Attorney, Agent, or Firm* — St. Onge Steward Johnston & Reens LLC

(57) ABSTRACT

An electric power tool comprises one or more optical waveguides which are combined with a shaped body so as to form a support element having a stable shape. The light guides may be part of optical switches or sensors. The support element ensures protection of the optical waveguides from vibrations, dust and so on, whereby a high level of operational reliability is ensured.

13 Claims, 2 Drawing Sheets

(56) References Cited

U.S. PATENT DOCUMENTS

| | | | |
|---|---|---|---|
| 5,038,481 A | 8/1991 | Smith | 30/392 |
| 5,156,221 A * | 10/1992 | Breitenmoser | 173/1 |
| 5,324,283 A * | 6/1994 | Heckele | 606/15 |
| 5,367,591 A * | 11/1994 | Seike et al. | 385/51 |
| 5,513,295 A * | 4/1996 | Go | 385/137 |
| 5,611,228 A * | 3/1997 | Dummermuth | 72/21.2 |
| 5,743,731 A * | 4/1998 | Lares et al. | 433/29 |
| 5,896,481 A * | 4/1999 | Beranek et al. | 385/90 |
| 5,970,200 A * | 10/1999 | Takikawa et al. | 385/137 |
| 6,102,695 A * | 8/2000 | Rosenstatter | 433/29 |
| 6,234,681 B1 | 5/2001 | Shahid | 385/65 |
| 6,282,351 B1 * | 8/2001 | Go et al. | 385/92 |
| 6,377,743 B1 * | 4/2002 | Ueda et al. | 385/137 |
| 6,461,052 B1 * | 10/2002 | Hines et al. | 385/53 |
| 6,637,917 B2 * | 10/2003 | Schwanz et al. | 362/487 |
| RE38,310 E * | 11/2003 | DeMeritt et al. | 385/14 |
| 6,757,471 B2 * | 6/2004 | Jeong et al. | 385/137 |
| 7,086,111 B2 * | 8/2006 | Hilscher et al. | 15/21.1 |
| 7,208,855 B1 * | 4/2007 | Floyd | 310/71 |
| 7,256,520 B2 * | 8/2007 | Braun et al. | 310/50 |
| 7,395,871 B2 * | 7/2008 | Carrier et al. | 173/1 |
| 7,400,812 B2 * | 7/2008 | Seifert | 385/135 |
| 2003/0034164 A1 | 2/2003 | Rudolf et al. | 173/2 |
| 2003/0057973 A1 * | 3/2003 | Nojima et al. | 324/753 |
| 2005/0036846 A1 * | 2/2005 | Kato | 409/230 |
| 2005/0225183 A1 * | 10/2005 | Braun et al. | 310/50 |
| 2006/0104085 A1 * | 5/2006 | Walker et al. | 362/578 |
| 2008/0116608 A1 * | 5/2008 | Kim et al. | 264/259 |

FOREIGN PATENT DOCUMENTS

| | | | | |
|---|---|---|---|---|
| EP | 0255661 | | 10/1988 | |
| JP | 9008384 A | | 1/1997 | |
| JP | 2003159626 A | * | 6/2003 | B23Q 5/04 |
| WO | 9922174 A1 | | 5/1999 | |

* cited by examiner

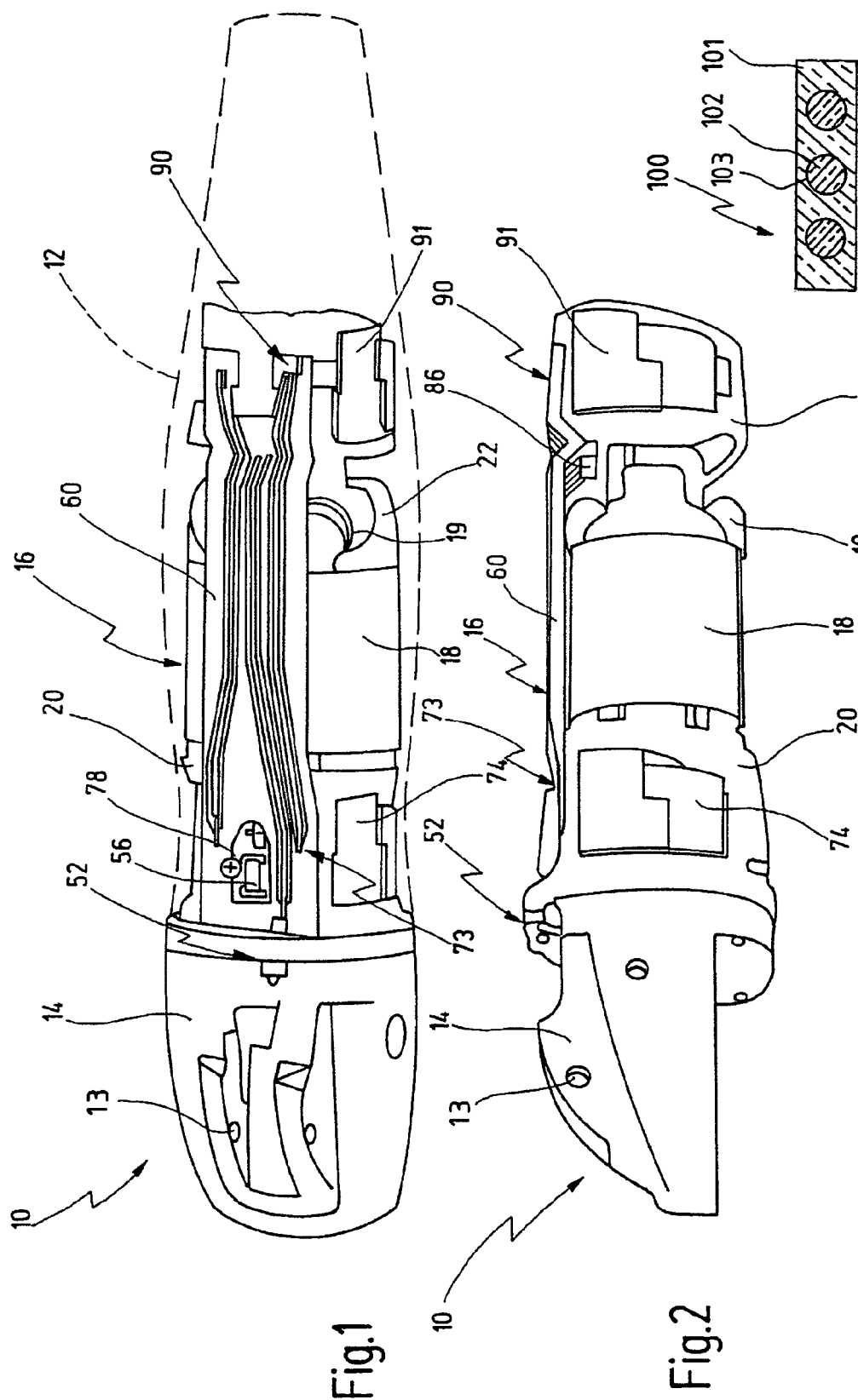

ELECTRIC TOOL HAVING AN OPTICAL CONTROL ELEMENT

RELATED APPLICATIONS

This application is a continuation application of copending International Patent Application PCT/EP2003/011098 filed Apr. 29, 2004 and claiming priority of German patent application DE 102 48 924.6 filed Oct. 17, 2002 which is fully incorporated by reference.

BACKGROUND OF THE INVENTION

The present invention relates to an electric tool with an electric motor adapted to drive a tool.

An electric tool of that kind has been known, for example, from U.S. Pat. No. 5,038,481. The known electric tool is a compass saw provided with a light source for observation of the cutting area. The light source may be connected via an optical waveguide.

Further, German patent application DE 197 14 248 A1 discloses a low-power motor unit for an electric tool which is particularly well-suited for dental applications, as drive for tooth drills, polishing, grinding, milling tools, screwing tools, or the like. In order to guarantee especially good handling properties, a supply unit for the low-power motor is connected with the low-power motor in rotating contactless fashion, for which purpose a plug-in connection and rotation-limiting means are preferably provided. The plug-in connection can be adapted to provide the connection of both the electric system and the fluid lines. Further, a lamp adapted to be coupled with the low-power motor via an optical waveguide can be provided in the working area of the electric tool.

More recently, there have been proposed by applicant electric tools that are controlled by means of optical switches each of which comprises two optical waveguides between which the transmission of light signals can be influenced via a control element. Depending on the signal received, the switch output is then controlled by an electronic evaluation unit.

Optical switches of that kind are known from U.S. patent application Ser. No. 10/214,844 which is fully incorporated by reference herewith.

In cases where optical waveguides are used in implementing optical switches or sensors of electric tools, this is done with the predominant aim to achieve high reliability as well as simple and low-cost assembly.

SUMMARY OF THE INVENTION

It is a first object of the invention to provide an electric tool having at least one optical waveguide received within the electric tool in a reliable and safe manner.

It is a second object of the invention to disclose an electric tool comprising one or more optical control elements, such as optical sensors or switches, that are safely received within the electric tool and are protected against environmental influences such as dust and the like.

It is a third object of the invention to disclose an electric tool having a high reliability in operation.

These and other objects of the invention are achieved by an electric tool with an electric motor adapted to drive a tool having at least one optical waveguide, which is combined with a support element serving as support to form a dimensionally stable unit.

The object of the invention is perfectly achieved in this way.

Each optical waveguide is sufficiently protected in this way from vibration, environmental influences and the like. Precise alignment of mutually associated optical waveguides and the fact that the optical waveguides are largely shielded from contact with dust, and the like, guarantee a favorable signal-to-noise ratio. In addition, the assembly operation is simplified by the fact that each optical waveguide is combined with a support element so that work is limited to mounting an already completed support element. It is thus no longer necessary to assemble separate, non-stabilized and unprotected optical waveguides.

The support element so formed is an element separate from the housing which serves to receive, to correctly position and to protect the optical waveguide connected or integrated with it. After integration of the optical waveguides and, if necessary, of other elements connected with them, the unit is then connected with the housing of the tool in suitable fashion.

According to a further development of the invention, the support element comprises a shaped body in which recesses are provided for locating the optical waveguides.

That embodiment therefore allows optical waveguides to be positioned and fixed in the locating recesses.

The optical waveguides may be rigid or flexible optical waveguides, made from a plastic material. In addition, it is of course also possible to use glass-fiber optical waveguides, preferably in the form of sheathed glass-fiber bundles.

The optical waveguides can be produced as rigid optical waveguides, for example as injection-molded elements, and can then be fitted in the respective recesses. However, there is also the possibility to use flexible optical waveguides that are fixed on the support element in a suitable way.

The support element may be a pre-shaped element, for example an injection-molded plastic element in which the completed optical waveguides are fitted or on which they are fixed in some other way.

An especially efficient and intimate connection, and especially good protection of the optical waveguides from environmental influences is, however, achieved when the one or more optical waveguides are connected with a shaped body in form-fitting fashion, preferably when they are completely embedded in it.

In this case, the optical waveguides and the shaped body may be combined, if desired, using the so-called 2-K technology. In this case, a first part, for example the shaped body, is first molded in an injection mold whereafter the remaining parts, such as the optical waveguides, are injection-molded into corresponding cavities left for this purpose. Due to the fact that different plastic materials are used for this purpose, especially intimate bonding is achieved in this case between the different components. It is understood that it is of course also possible in this case to first mold the optical waveguides and to then mold the shaped body around them.

Basically, the optical waveguides can be configured as completely sheathed optical waveguides, with the sheathing, consisting of an optically thinner medium, guaranteeing the necessary total reflection. This then also provides an especially good signal-to-noise ratio.

However, when the optical waveguides are completely coated with the material of the shaped body, it is of course also imaginable to configure the boundary surfaces between the optical waveguides and the coating in a manner to provide total reflection. In order to obtain reliable total reflection, it is then necessary to give the optical waveguide a higher refractive index and the plastic material of the surrounding shaped body, which then is optically transparent, a correspondingly lower refractive index.

There is also the possibility in this case, if necessary, to fill the cavities of the hollow body with fluid in such a way that total reflection will be achieved again at the boundary surfaces to the surrounding shaped body. This may result in improved mechanical damping properties of the support element so produced.

Further, the shaped body may comprise mounting points for transmitter or receiver elements associated to the optical waveguides, or for switching elements adapted to influence radiation transmitted by the optical waveguides.

Further, the shaped body may comprise positioning points for LEDs.

It is thus possible to mount on the support elements not only the optical waveguides but also the associated transmitter or receiver elements, together with the associated switching elements, which generally allows both the structure and the assembly operation to be simplified.

Moreover, it is preferred to have the shaped body cooperate with the housing of the electric tool for sealing the optical waveguides fitted in the shaped body, and/or the transmitter or receiver elements or switching element coupled with them, so as to protect them from contamination by dust or the like.

This leads to higher operating safety, the support element serving to shield the optical waveguides from dust or the like. This is of particular importance in connection with tools where high amounts of dust are expected to occur, as is the case for example with grinding tools.

According to an additional further improvement of the invention, the shaped body consists of a vibration-damping and/or acoustically damping material.

This also leads to improved operating safety and, in addition, to an ergonomically improved design.

The shaped body may, for example, be configured as a three-dimensionally shaped plate and may take the form of a compression-molded plastic part or of an injection-molded plastic part.

This permits low-cost production and adaptation to the most different shapes to be guaranteed.

The shaped body may additionally comprise recesses and/or projections intended to receive parts of the electric tool or for connection of parts of the electric tool.

This allows the flat support element to be fitted in the electric tool in a favorable way.

It is understood that the features of the invention mentioned above and those yet to be explained below can be used not only in the respective combinations indicated, but also in other combinations or in isolation, without leaving the scope of the present invention.

BRIEF DESCRIPTION OF THE DRAWINGS

Further features and advantages of the invention will be apparent from the description that follows of certain preferred embodiments, with reference to the drawing in which:

FIG. 1 shows a view, seen obliquely from the top, of an electric tool according to the invention in the form of an angle grinder shown in partly assembled condition and with a rod-shaped housing;

FIG. 2 shows a side view of the electric tool illustrated in FIG. 1;

FIG. 6 shows a cross-section through an alternative embodiment of a support element having three optical waveguides in a shaped body applied around them by injection-molding.

DETAILED DESCRIPTION OF THE PREFERRED EMBODIMENTS

Figure 3:
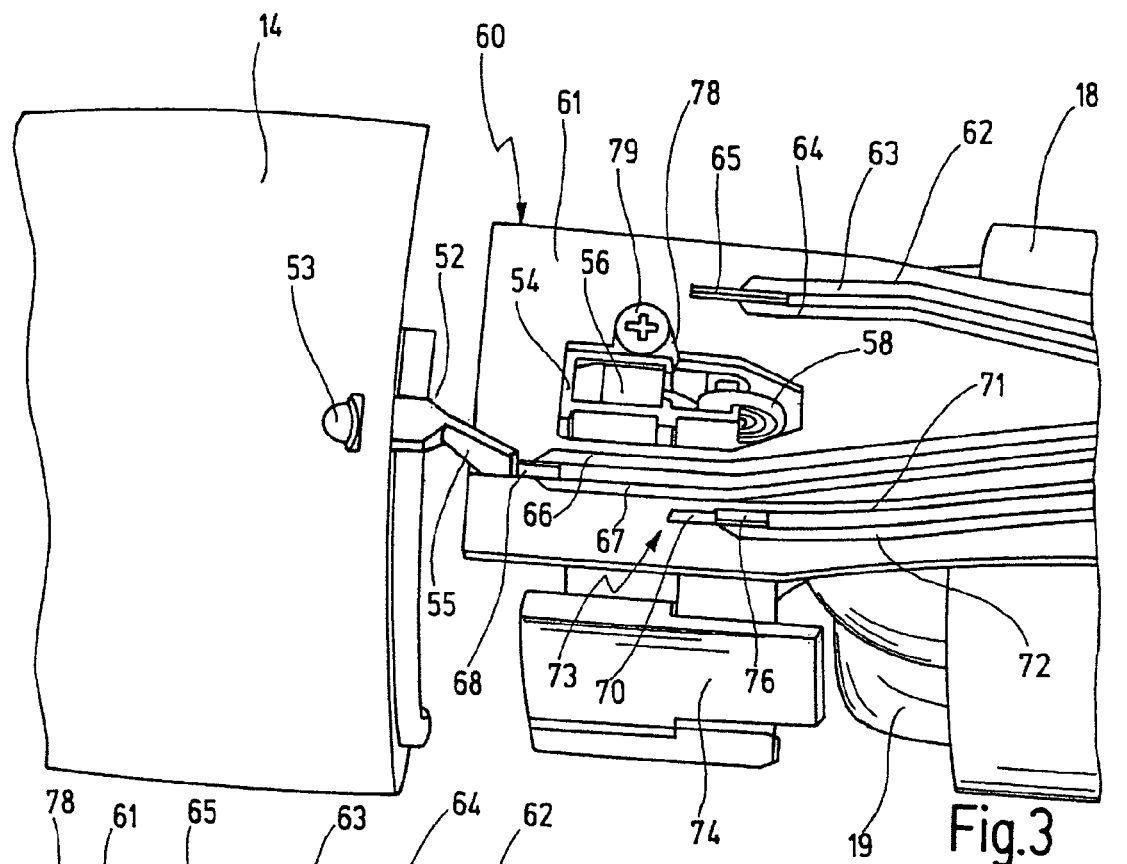
FIG. 3 shows an enlarged representation of the electric tool illustrated in FIG. 1, i.e. of the area between the tool head and the stator.

FIG. 1 shows a top view of an electric tool according to the invention indicated generally by reference numeral 10.

The tool shown is an angle grinder with a rod-shaped housing which latter is indicated in FIG. 1 by broken lines only, and is indicated by reference numeral 12.

The electric tool 10 comprises an electric motor with a self-supporting stator 18, whose two ends are provided with a first carrying element 20 and a second carrying element 22, respectively.

The two carrying elements 20, 22 are screwed together through the stator 18 of the electric tool 16, to form a strong unit on which further parts of the electric tool are mounted. The first carrying element 20 supports, for example, a tool head 14 with its gearing. And the optical switches 52, 73 are likewise mounted on that carrying element. The second carrying element carries further optical switches, one of which is indicated by reference numeral 90. In addition, the motor shaft with the armature (not shown) is likewise supported on the carrying elements 20, 22 or the tool head 14, respectively. Finally, an electronic control unit (not shown) adapted to control the electric tool 10 is mounted on the second carrying element 22. The housing 12 of the electric tool is likewise mounted on the two carrying elements 20, 22.

The switches are configured as optical switches with optical waveguides, between which the transmitted signals can be influenced via controlling elements, the optical waveguides having associated to them transmitter and receiver elements of the kind basically known from German Patent Application 101 41 161.8, which however has not been published yet and the disclosure of which is included herein by reference.

Mounted on the first carrying element 20, in opposite arrangement on the upper face of the electric tool 10, and offset by 180° also on the lower face, are respective brush holders 54 with a brush (carbon brush) 56 received in them, respectively. Pressure is applied on each of the brushes 56 by a brush spring 58, which is indicated diagrammatically only in FIG. 3.

There can be further seen in FIGS. 1 and 2 the mounting holes 13 for a clamping lever positioned on the tool head 14 and intended for loading and unloading the tool (for example a grinding wheel). Given the fact that the electric tool 10 should be operated only with the clamping lever in closed condition, the clamping lever cooperates with a sensor which continuously checks that the clamping lever occupies its closed position. The upper end of the tool head 14 is provided for this purpose with a light-optical switch 52 that can be operated via a switching element 53 adapted for being displaced by the clamping lever. In the closed position of the clamping lever, the switching element 53 is displaced with the result that a light beam is released and transmitted via optical waveguides, a circumstance which is evaluated by associated evaluation logics.

As can be seen in FIGS. 1 and 2, there is further provided on the upper surfaces of the first and the second carrying elements a support element 60 on which a plurality of optical waveguides are mounted that are part of the optical switches 52, 73, 90.

In FIG. 3, the structure of the optical switches 52, 73, 90 used in the electric tool 10 can be seen in more detail. Each optical switch comprises two optical waveguides, one of them being configured as a transmitter pipe coupled with an LED, the other one being configured as a receiver pipe connected with an associated evaluation unit. In the illustrated case, every two associated optical waveguides end at a certain distance one from the other, in the form of prisms, so that light can cross over between them. If no object is present between the two prisms light will cross over from the transmitter pipe to the receiver pipe, a circumstance that will be detected by the evaluation logics.

FIG. 3 now shows a total of six optical waveguides 63, 64, 66, 67, 71, 72, each received in recesses 62 configured as groves in a shaped body 61. The shaped body 61 is part of the support element 60 whose shape can be seen more clearly in FIG. 4. The shaped body 61 consists substantially of a plate made from a suitable plastic material, which is suitably curved in the direction of extension of the optical waveguides 63 to 72 received in it. The plastic material of the shaped body 61 preferably has mechanically and, if necessary, acoustically damping properties so that vibration can be damped more efficiently. Given the fact that the optical waveguides 63 to 72 are fitted in associated recesses 62 in the form of grooves, they are especially well protected from external environmental influences so that reliable operation is guaranteed. Moreover, a favorable signal-to-noise ratio is guaranteed, and the path of the optical waveguides is fixed by the spacing defined by the recesses 62. This can be achieved, preferably, by the use of rigid optical waveguides that are curved three-dimensionally to provide the desired shape.

In the illustrated case, an oblong recess 65 or 68 or 70, which extends from the two ends in the area of the prisms toward the outside, is associated to each pair of mutually associated optical waveguides 63, 64 or 66, 67 or 71, 72. That recess 65, 68, 70 can be engaged by an associated switching element for interrupting the light crossing over between the two ends.

In FIG. 3, the recess 68 between the two optical waveguides 66, 67 cooperates with a slide 55 that can be moved by the switching element 53 into the area between the two prism ends for preventing the light from crossing over. The switch 73, which cooperates with the two optical waveguides 71, 72, is provided in the area of the recess 70 with a switching element 74 which is pivotally mounted on the first carrying element 20 and which is provided with a switching tongue 76 adapted to be moved into the area of the recess 70 between the two prism ends of the optical waveguides 71, 72.

The shaped body 61 is further provided with a suitable recess for mounting the brush holder 54 with the brush 56 and the brush spring 58 of the electric motor 16. A corresponding mounting screw 79 can be seen in FIG. 3.

Figure 4:
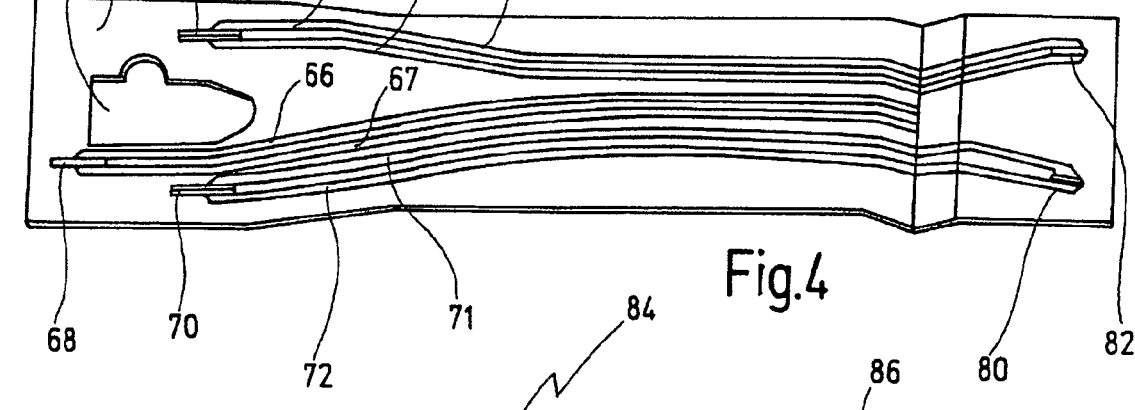
FIG. 4 shows a view of the support element according to FIG. 1.

FIG. 4 shows an overall view of the support element 60 together with the optical waveguides 63 to 72.

Figure 5:
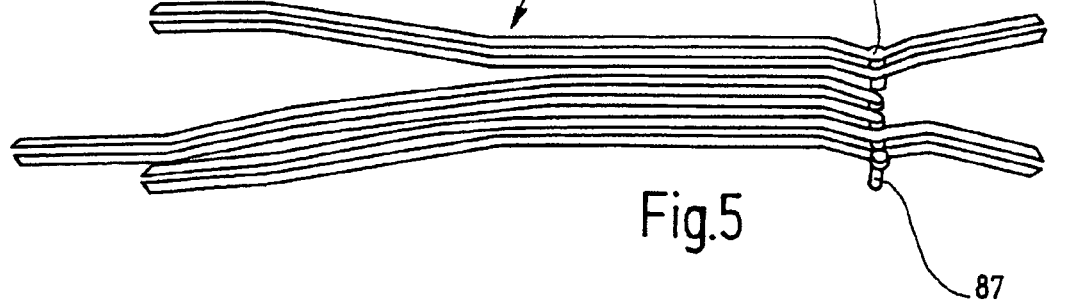
FIG. 5 shows a view of the optical waveguide bundle intended to be inserted into the support element according to FIG. 4.

FIG. 5 illustrates a way of combining the respective optical waveguides 63 to 72, being preferably rigid and held together by a common support 86, to a pre-fabricated optical waveguide bundle 84. The support comprises recesses for connection of LEDs for associated transmitter diodes, and connections for receiver elements. In FIG. 5, a single LED 87 is indicated by way of example.

FIGS. 1 and 2 further illustrate the way in which the support element 60, with the optical waveguides received in it, has been placed on the upper face of the two carrying elements 20, 22 and has been inserted directly adjacent the tool head 14. When the housing is then fitted, it preferably assumes a sealing relationship relative to the edges of the support element 60. Thus, the support element 60 occupies a position adjacent the fitted housing, with the optical waveguides received in it safely protected from dirt or the like that may penetrate into the housing.

There can be further seen in FIG. 2 the slightly angled shape of the support element 60 in the area of the support 86 on which the transmitter LEDs and the receiver elements are arranged. There can be further seen in FIG. 2 the switching elements 74 and 91, which cooperate with the switches 73 and 90, for interrupting the transmission of light between associated optical waveguides.

An alternative embodiment of the support element according to the invention is illustrated in FIG. 6, and is indicated generally by reference numeral 100.

Three optical waveguides 102, made from a plastic material, are fully enclosed in this case by a plastic shaped body 101. This can be effected, for example, by coating the optical waveguides with plastic material in a suitable injection mold. The optical waveguides as such may be provided in this case with a suitable sheathing to guarantee light-piping by total reflection. However, it is likewise imaginable to ensure total reflection by a corresponding configuration of the boundary surfaces 103 between the optical waveguides and the surrounding plastic material of the shaped body 101. In the latter case, the shaped body 101 consists of a suitable transparent plastic material of lower optical density (a lower refractive index) than the embedded optical waveguides 102 so that reliable total reflection is obtained.

It is understood that instead of proceeding in the way described above, it is of course also possible to coat glass optical waveguides or plastic optical waveguides, which as such are sheathed in a suitable way, with a plastic material in the conventional way. The shaped body may then be made from a considerably softer material with clearly approved mechanical and acoustic damping properties. This in turn may result in improved vibration damping and noise damping and may guarantee especially reliable long-time operation.

The invention claimed is:

1. An electric tool comprising:
   a housing;
   an electric motor for driving a tool;
   a shaped body having a plurality of recesses, said shaped body being a preformed, independently supported part, separate from said housing, said shaped body being assembled with a plurality of optical waveguides received in said recesses to a self-supported dimensionally stable unit mounted to said housing; and
   an optical control element for controlling said electric tool, comprising at least one of said waveguides and an optical sensor;
   wherein said optical waveguides are shaped three-dimensionally to deviate from a plane in more than one direction to provide a desired shape;
   wherein said shaped body is a non-planar plate that is suitably shaped in the direction of extension of said optical waveguides and is assembled between said electric motor and an inner surface of said housing, thereby protecting said waveguides extending along said motor.

2. The electric tool of claim 1, wherein said optical control element comprises an optical switch.

3. The electric tool of claim 1, wherein said optical control element comprises two optical waveguides, a transmitter element and a receiver element, as well as a control element configured for influencing light signals transmitted between the optical waveguides.

4. The electric tool as defined in claim 3, wherein said shaped body comprises a support for at least one element selected from the group formed by a transmitter element, a receiver element, and a control element.

5. The electric tool of claim 1, wherein said shaped body is mated to said housing for sealing components supported thereon against environmental influences, wherein said components are selected from the group formed by an optical waveguide, a transmitter element, a receiver element, a control element, and a switching element.

6. The electric tool of claim 1, wherein said shaped body comprises a material selected from the group formed by a vibration-damping material and an acoustically damping material.

7. An electric tool comprising:
a housing;
an electric motor for driving a tool;
a shaped body having at least one recess;
at least one optical control element comprising at least one optical waveguide supported within said recess and an optical sensor;
said optical waveguide together with said shaped body forming a self-supported dimensionally stable support element being configured for mounting within said housing;
wherein said optical control element is configured for controlling said electrical tool; and
wherein said optical waveguides are shaped three-dimensionally to deviate from a plane in more than one direction to provide a desired shape;
wherein said shaped body is a non-planar plate that is suitably shaped in the direction of extension of said optical waveguides and is fitted to said housing between an inner surface of said housing and said electric motor, thereby protecting said waveguides that extend within said shaped body along said motor.

8. The electric tool of claim 7, wherein said optical control element comprises an optical switch.

9. The electric tool of claim 7, wherein said optical control element comprises two optical waveguides, a transmitter element and a receiver element, as well as a control element configured for influencing light signals transmitted between the optical waveguides.

10. The electric tool as defined in claim 9, wherein said shaped body comprises a support for at least one element selected from the group formed by a transmitter element, a receiver element, and a control element.

11. The electric tool of claim 7, wherein said support element is mated to said housing for sealing components supported thereon against environmental influences, wherein said components are selected from the group formed by an optical waveguide, a transmitter element, a receiver element, a control element, and a switching element.

12. The electric tool of claim 7, wherein said shaped body comprises a material selected from the group formed by a vibration-damping material and an acoustically damping material.

13. An electric tool comprising:
a housing;
an electric motor for driving a tool;
a shaped body having a plurality of recesses, said shaped body being a preformed, independently supported part, separate from said housing, said shaped body being assembled with a plurality of optical waveguides received in said recesses to form a self-supported dimensionally stable unit mounted to said housing; and
an optical control element for controlling said electric tool, comprising at least one of said waveguides and an optical sensor;
wherein said optical waveguides are shaped three-dimensionally to deviate from a plane in more than one direction to provide a desired shape;
wherein said shaped body is a non-planar plate that is suitably shaped in the direction of extension of said optical waveguides and is assembled between said electric motor and an inner surface of said housing, thereby protecting said waveguides that extend along said motor from a first end of the motor to a second end of the motor.

* * * * *